US011551322B2

(12) United States Patent
Glatfelter et al.

(10) Patent No.: US 11,551,322 B2
(45) Date of Patent: Jan. 10, 2023

(54) METHODS AND DEVICES FOR SEARCHING FOR A MISSING PERSON

(71) Applicant: The Boeing Company, Chicago, IL (US)

(72) Inventors: John William Glatfelter, Kennett Square, PA (US); Brian D. Laughlin, Wichita, KS (US)

(73) Assignee: THE BOEING COMPANY, Chicago, IL (US)

( * ) Notice: Subject to any disclaimer, the term of this patent is extended or adjusted under 35 U.S.C. 154(b) by 660 days.

(21) Appl. No.: 16/402,487

(22) Filed: May 3, 2019

(65) Prior Publication Data

US 2020/0349664 A1   Nov. 5, 2020

(51) Int. Cl.
| | | |
|---|---|---|
| *G06Q 10/10* | (2012.01) | |
| *G06Q 10/06* | (2012.01) | |
| *G06Q 30/02* | (2012.01) | |
| *G06Q 50/26* | (2012.01) | |
| *G06Q 50/00* | (2012.01) | |
| *G06F 16/23* | (2019.01) | |
| *G06F 16/2458* | (2019.01) | |

(52) U.S. Cl.
CPC ....... *G06Q 50/265* (2013.01); *G06F 16/2379* (2019.01); *G06F 16/2477* (2019.01); *G06Q 50/01* (2013.01)

(58) Field of Classification Search
CPC .. G06Q 50/265; G06Q 50/01; G06F 16/2379; G06F 16/2477
USPC .................................. 705/1.1–912, 319, 325
See application file for complete search history.

(56) References Cited

U.S. PATENT DOCUMENTS

| | | | | |
|---|---|---|---|---|
| 10,431,101 | B2* | 10/2019 | Singla ................. | G08G 5/0013 |
| 10,641,880 | B2* | 5/2020 | Dsilva ....................... | G01S 5/14 |
| 10,921,132 | B2* | 2/2021 | King .................. | G01C 21/3626 |
| 2003/0034887 | A1* | 2/2003 | Crabtree ................ | G01S 13/84 |
| | | | | 340/539.1 |
| 2005/0210131 | A1* | 9/2005 | Motoyama .............. | H04L 67/18 |
| | | | | 709/224 |
| 2006/0287872 | A1* | 12/2006 | Simrell ............. | G06Q 30/0281 |
| | | | | 709/219 |
| 2007/0188320 | A1* | 8/2007 | Smith .................... | G01C 21/20 |
| | | | | 340/539.13 |
| 2010/0262367 | A1* | 10/2010 | Riggins ................. | G01C 21/26 |
| | | | | 701/533 |

(Continued)

OTHER PUBLICATIONS

Alsagoff, S N., "Optimal Grid Pattern Model For Search and Rescue Operation in Dipterocarp Forest Research Methodolog", WIT Transactions on the Built Environment 117: 149-158. Southampton: W I T Press. doi:http://dx.doi.org/10.2495/SAFE110141 (2011). (Year: 2011).*

*Primary Examiner* — Jonathan P Ouellette (74) *Attorney, Agent, or Firm* — Coats & Bennett, PLLC (57) ABSTRACT

Methods and devices for searching for a missing person. Data sources are accessed through an IP network to obtain information about the missing person. Based on the obtained information, potential scenarios are develop of the current location of the missing person. The information is disseminated to search entities that search the geographic areas of the potential scenarios. Additional information is obtained about the missing person during the search to further develop the potential scenarios and focus the search areas.

20 Claims, 8 Drawing Sheets

(56) References Cited

U.S. PATENT DOCUMENTS

| | | | |
|---|---|---|---|
| 2011/0046920 A1* | 2/2011 | Amis | G01S 19/17 |
| | | | 702/181 |
| 2014/0328512 A1* | 11/2014 | Gurwicz | G06K 9/6263 |
| | | | 382/103 |
| 2015/0063202 A1* | 3/2015 | Mazzarella | H04W 4/90 |
| | | | 370/316 |
| 2015/0066248 A1* | 3/2015 | Arbeit | G01C 21/20 |
| | | | 701/2 |
| 2015/0317356 A1* | 11/2015 | Deichler | G06Q 10/10 |
| | | | 707/760 |
| 2017/0088261 A1* | 3/2017 | Sequeira | G08G 5/00 |
| 2018/0039262 A1* | 2/2018 | Fox | H04B 7/18506 |
| 2018/0082560 A1* | 3/2018 | Gillum | G08B 21/0272 |
| 2019/0171740 A1* | 6/2019 | Sabripour | G08B 29/20 |
| 2020/0334470 A1* | 10/2020 | Abeykoon | G08B 25/14 |

\* cited by examiner

METHODS AND DEVICES FOR SEARCHING FOR A MISSING PERSON

TECHNOLOGICAL FIELD

The present disclosure relates generally to the field of data analysis and, more specifically, to analyzing sources of information through an IP network to obtain information to locate a missing person.

BACKGROUND

Search and rescue is the search for and provision of aid to people who are in distress or imminent danger. The general field of search and rescue includes many specialty subfields, typically determined by the type of terrain the search is conducted over. These include mountain rescue; ground search and rescue, including the use of search and rescue dogs; urban search and rescue in cities; combat search and rescue on the battlefield and air-sea rescue over water.

Search and rescue actions are time-sensitive as the missing person is often in need of aid. Many search and rescue operations gather huge amounts of information that could prove useful in finding the person. However, it is difficult to parse through this amount of information in a timely manner.

The United States Coast Guard is a leader in the United States in conducting search and rescue missions. Unfortunately, the budget constraints have reduced the amount of available funds to back these missions. Therefore, better approaches are required that use less money and/or resources but still provide the necessary results of finding missing persons.

SUMMARY

One aspect is directed to a method of searching for one or more missing persons or entities. The method includes: receiving an indication that one or more persons or entities are missing; collecting and analyzing information about the one or more persons or entities from a plurality of data sources accessed through a communications network; calculating content and potential scenarios about the one or more persons or entities based on the information from the plurality of data sources; determining a positive lead of a location of the one or more persons or entities; calculating time-based search grids that emanate from the location; projecting the time-based search grids onto contoured local geography; and obtaining new information through the communications network and updating the content and the time-based search grids based on the new information.

In another aspect, collecting the information about the one or more persons or entities are from the plurality of data sources includes obtaining the information from social media accounts of the one or more persons or entities.

In another aspect, collecting the information about the one or more persons or entities from the plurality of data sources includes obtaining the information from data sources that include sensor data.

In another aspect, the method further includes creating a timeline of events for the potential scenarios based on the content obtained from the plurality of data sources.

In another aspect, the method further includes performing behavioral analysis on the one or more persons or entities using the information and calculating one or more trends about the one or more persons or entities and creating one or more of the potential scenarios.

In another aspect, determining the positive lead of the location of the one or more persons or entities including determining a car that is driven by the one or more persons or entities based on the information and obtaining a sensor reading from one of the plurality of data sources that comprises an image of the car, a location of the car, and a time that the car was at the location.

In another aspect, the method further includes receiving the new information about the one or more persons or entities from an unmanned autonomous vehicle that is operating within the time-based search grid and updating the content and the time-based search grid.

In another aspect, the method further includes limiting a search area for the one or more persons or entities based on the information collected about the one or more persons or entities.

In another aspect, the method further includes for each of the potential scenarios, calculating a time sequence comprising a plurality of separate events based on the information.

In another aspect, the method includes that the updated time-based search grids are smaller than the original time-based search grids.

One aspect is directed to a method of searching for one or more missing persons or entities. The method includes: receiving an input indicating that one or more persons or entities is missing; responsive to receiving the input, accessing multiple data sources through a communications network and obtaining information about the one or more persons or entities, the data sources including sensor data, government data, and social media data; calculating one or more potential time sequences about the one or more persons or entities based on the information; determining a specific location and time where the one or more persons or entities was located; calculating one or more calibrated time-based search grids based on the specific location and time; and updating the time-based search grids based on newly-received information about the one or more persons or entities.

In another aspect, the method includes that accessing multiple data sources through the communications network includes accessing the social media data and determining the specific location and the time where the one or more persons or entities had previously visited.

In another aspect, the method further includes aggregating the information about the one or more persons or entities from the multiple data sources and calculating the one or more potential time sequences about the one or more persons or entities.

In another aspect, determining the specific location and the time of the one or more persons or entities includes obtaining a captured image of the one or more persons or entities from one of the data sources and determining the location of the one or more persons or entities at the time of the image.

In another aspect, calculating one or more potential time sequences about the one or more persons or entities includes analyzing the information and calculating one or more behavioral patterns about the one or more persons or entities.

In another aspect, the method further includes determining an additional person that is referenced in one of the data sources references through the communications network and accessing social media accounts of the additional person through the communications network and obtaining the information about the one or more persons or entities.

One aspect is directed to a computing device configured to search for one or more missing persons or entities. The computing device includes a communication interface circuit configured to communicate data with one or more remote data sources via a communications network. A memory circuit is configured to store a search application. Processing circuit is operatively connected to the communication interface circuit and the memory circuit and is configured to execute the search application to: receive an indication that a one or more persons or entities is missing; collect and analyze information about the one or more persons or entities from a plurality of data sources accessed through the communications network; calculate potential scenarios about the one or more persons or entities based on the information from the plurality of data sources; determine a positive lead of a location of the one or more persons or entities; calculate time-based search grids that emanate from the location; and obtain new information through the communications network and update the time-based search grids based on the new information.

In another aspect, the processing circuit is configured to collect information from social media platforms of the missing one or more persons or entities.

In another aspect, the processing circuit is configured to obtain the information from social media accounts of the one or more persons or entities.

In another aspect, the processing circuit is further configured to create a timeline of events for the potential scenarios based on the content obtained from the plurality of data sources.

The features, functions and advantages that have been discussed can be achieved independently in various aspects or may be combined in yet other aspects, further details of which can be seen with reference to the following description and the drawings.

DETAILED DESCRIPTION

Figure 1:
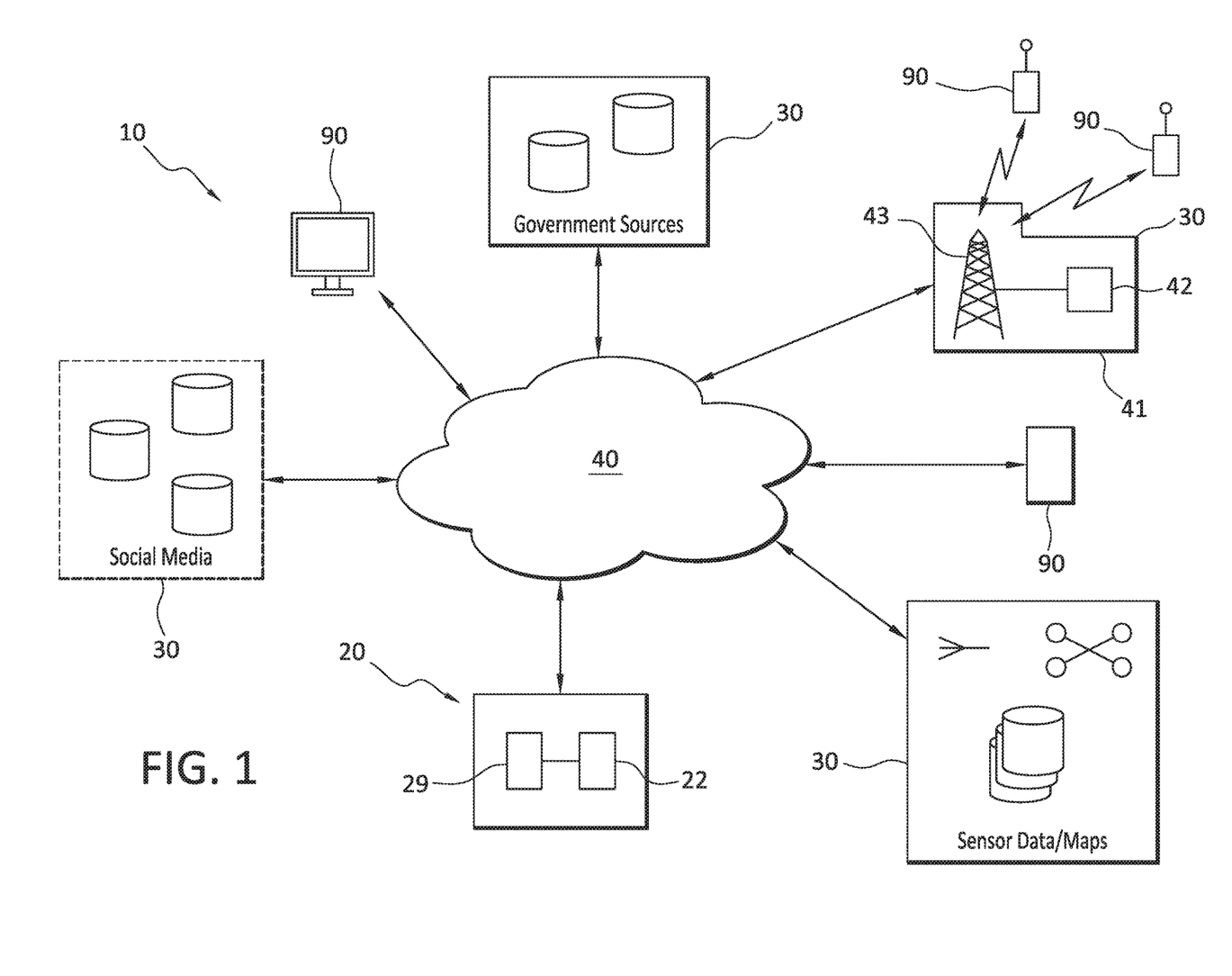
FIG. 1 is schematic diagram of a search system for locating a missing person.

FIG. 1 illustrates a communications network 10 that can be mined to obtain information useful in locating the missing person. The communications network 10 provides for digital communications through an IP network 40, such as a public data network. The IP network 40 can include a public network such as the Internet, or a private network. The communications network 10 further includes data sources 30 that are accessible through the IP network 40 and can contain information about the missing person. Data source 30 can include but are not limited to: social media platforms such as FACEBOOK, TUMBLER, and TWITTER; government sources such as the Department of Transportation and the Internal Revenue Service, local, state, and federal planning and zoning boards and various parks and park services; mobile communications networks; sensor data from various vehicles; websites containing sensor data such as tollbooths that record license plate numbers, traffic cameras that record the traffic in an area (e.g., traffic moving through an intersection), and parking lot cameras; and maps of geographic locations where the missing person may be located such as GOOGLE maps.

Figure 2:
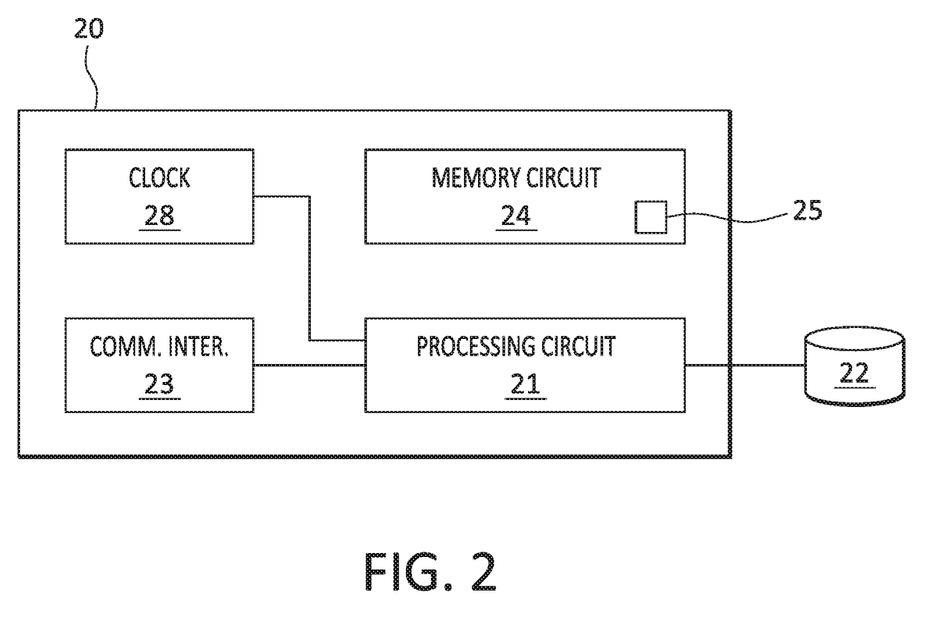
FIG. 2 is a schematic diagram of a searching server.

A searching server 20 is operatively connected to the IP network 40 and able to access the various data sources 30. The searching server 20 is a robust automated computing device that collects and analyzes the information obtained from the data sources 30 and communicates real time data to search entities 90. As illustrated in FIG. 2, the searching server 20 includes one or more processing circuits (illustrated as processing circuit 21) that can include one or more microprocessors, microcontrollers, Application Specific Integrated Circuits (ASICs), or the like, configured with appropriate software and/or firmware. A computer readable storage medium (shown as memory circuit 24) stores data and a search application 25 that configures the processing circuit 21 to implement the techniques disclosed herein. Memory circuit 24 is a non-transitory computer readable medium, and can include various memory devices such as random access memory, read-only memory, and flash memory.

A communication interface circuit 23 connects the server 20 to the IP network 40, and can be configured to communicate with the IP network 40 according to one or more 802.11 standards. The communication interface circuit 23 can support a wired connection (e.g., Ethernet), a wireless connection, or both.

A database 22 is stored in a non-transitory computer readable storage medium (e.g., an electronic, magnetic, optical, electromagnetic, or semiconductor system-based storage device). The database 22 can be local or remote relative to the searching server 20. A clock 28 may be associated with the processing circuit 21 that measures the various timing requirements.

In addition to collecting and analyzing information about the missing person, the searching server 20 is configured to disseminate the information to search entities 90. Search entities 90 can include but are not limited to emergency personnel such as police, firefighters, armed services personnel, park rangers, volunteer searchers, and family members. The search entities 90 are equipped with electronic equipment to access the information at the searching server 20. The electronic equipment can include but is not limited to laptop computers, personal computers, personal digital assistants, mobile computing/communication, tablet devices, and various other-like computing devices. The electronic equipment can also include body-worn devices such as a watch or pendant which can be worn by searchers in the field.

To provide access to the information, the searching server 20 includes a web interface 29. The web interface 29 can support a website through which the contents of the database 22 are accessible. In one design, the web interface 29 provides browser-based access to the contents of the database 22. The search entities 90 can login to the browser-based interface and access the missing person information. Alternatively, the different entities 90 can obtain the information from the database 22 using one or more Application Programming Interfaces (APIs) through a desktop or mobile client, for example. Also, in one or more embodiments the web interface 29 supports access to the database 22 using web services in addition to, or as an alternative to, the browser-based interface described above.

In one or more embodiments, the searching server 20 may be configured for browser-based accessibility. The browser-based interface may support well-known browsers such as Internet Explorer and Mozilla Firefox, Safari, Chrome. Alternatively, or in conjunction with the browser-based interface, the searching server 20 can provide access to the database 22 to requesting APIs over the IP network 40.

Search entities 90 can also access the searching server 20 through a cellular interface that enables communication with a mobile communication network 41 (e.g., a WCDMA, LTE, or WiMAX network). The mobile communication network (MCN) 41 includes a core network 42 and a radio access network (RAN) 43 including one or more base stations. The MCN 41 can be a conventional cellular network operating according to any communication standards now known or later developed. For example, the MCN 41 can comprise a Wideband Code Division Multiple Access (WCDMA) network, a Long Term Evolution (LTE) network, or WiMAX network. The MCN 41 is further configured to access the IP network 40.

The searching server 20 receives information from the various different data sources 30. The information can include text, images, location points, and metadata. The searching server 20 can analyze the text for keywords, such as names, dates, and locations. The text can also be analyzed to determine if certain words are used repetitively throughout one or more data sources 30. Image data can be analyzed to provide various information. Facial recognition software can provide the names of persons appearing in images. Images can also be analyzed to identify specific landmarks such as the Grand Canyon, a particular football stadium, or a restaurant. Images can also be analyzed to determine more general aspects, such as a mountain or beach region. Metadata can be analyzed to provide dates of when images or text were created and who accessed information. Statistical data can also be culled from the metadata. Information from the mobile communication network 41 can provide location history of the missing person's mobile equipment and text data.

Based on the information, the searching server 20 calculates possible scenarios where the missing person can be located. This information can be in existence prior to the time that the person is reported as being missing (e.g., social media data) as well as information that is gathered after the person is reported as missing (e.g., terrain data obtained by unmanned autonomous vehicles). These scenarios are then used to focus the search efforts of the search entities 90.

Figure 3:
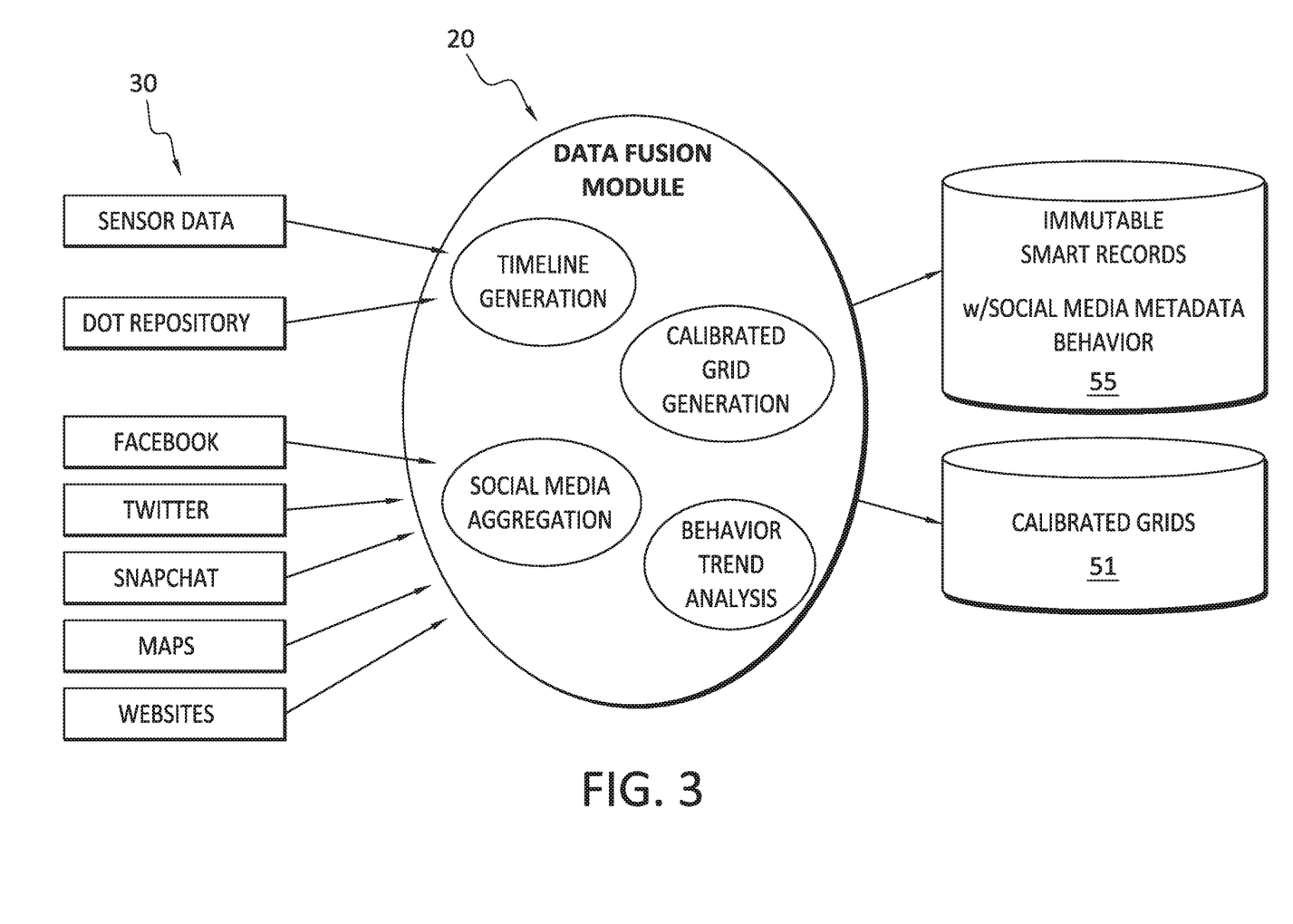
FIG. 3 is a schematic diagram of the functions of the searching server in obtaining, fusing, and outputting information about the missing person.

FIG. 3 illustrates functionality that is performed by the searching server 20 during the process of searching for the missing person. The searching server 20 obtains information about the missing person from the various data sources 30 that are accessible through the IP network 40.

Upon receiving an indication that a person is missing, the searching server 20 obtains information from the various data sources 30. Using the information from the multiple data sources 30, the searching server 20 fuses the information together to calculate possible scenarios of the current location of the missing person. These calculations can include a timeline generation of times and locations where the missing person was located. For example, a FACEBOOK account of the missing person may include an entry about being at dinner on at a specific date and time. Another example is a DOT camera capturing the missing person's vehicle driving through a tollbooth at a specific date and time.

Another example is aggregating information from the different social media data sources 30. The information can be categorized/classified/organized in a manner to provide searchable results. These results can be used at various times during the search by the search entities 90. For example, the missing person's vehicle is recorded at a tollbooth driving north. The aggregated social media information about the missing person can include that the person owns a vacation home in that vicinity and would provide for a likely scenario of his current location.

The information from the data sources 30 can be fused together to determine behavioral trends of the missing person. These trends can be used to determine potential scenarios. Examples include but are not limited to the missing person often goes camping on weekends, enjoys nature photography, enjoys fishing, spends time with a certain group of people, belongs to one or more clubs/organizations, goes on vacation during certain times of the year, etc.

The analysis performed by the searching server 20 on the missing person information can also lead to additional data sources 30 that can be accessed through the IP network 40. For example, the information the data sources 30 that includes information directly about the missing person can further indicate that he has a group of friends. Data sources 30 relevant to the group of friends can also be accessed to determine additional information about the missing person. Another example is determining that the missing person belongs to a hiking club. The website 30 of the club can be accessed to obtain more information. For example, the website may indicate that the hiking club is having an overnight camping trip to a particular park. Additional searching can indicate that the hiking club is affiliated with another hiking club in a nearby state which can also potentially lead to more information about the missing person. These second, third, and even more distance data sources 30 of information can be accessed by the searching server 20 and analyzed and fused with other information to provide for determining potential scenarios where the missing person may be located.

Figure 4:
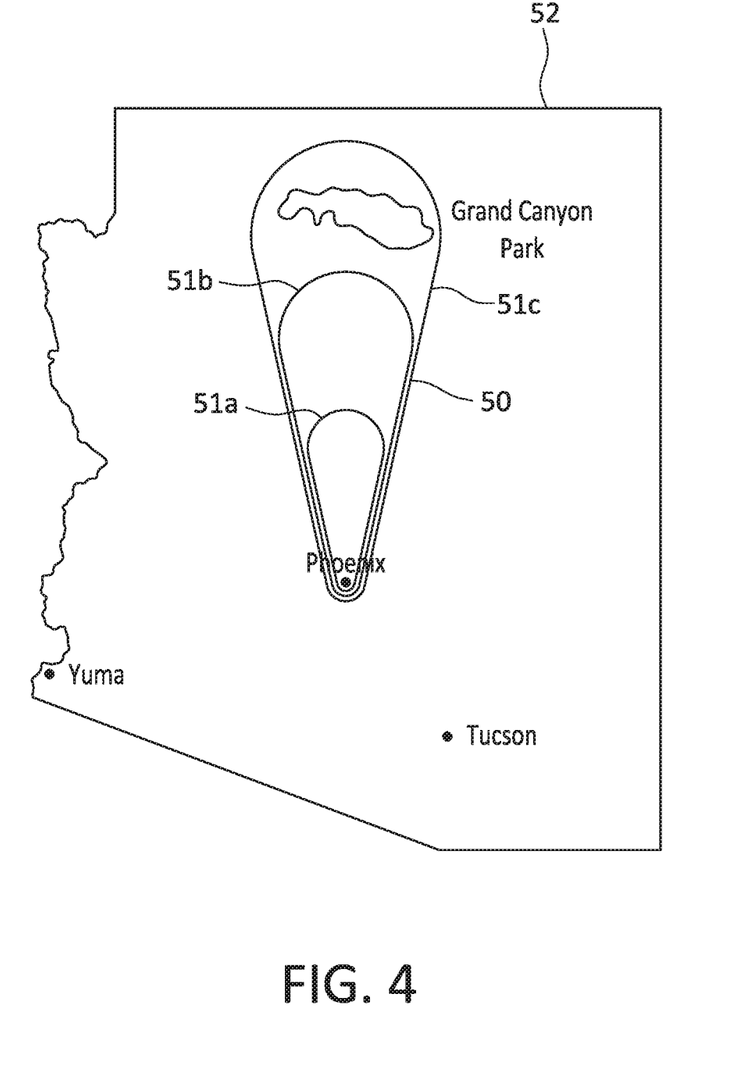
FIG. 4 is a schematic diagram of a map with a search grid based on a potential scenario of a location of the missing person.

The searching server 20 also can also prepare search grids 50 based on the information about the missing person and the potential scenarios. The search grids 50 can include calibrated grids 51 based on the timing aspects. FIG. 4 includes a map 52 of a geographic area where the missing person is most likely located. In this example, the missing person lives in Phoenix and the map 52 includes the surrounding geographic area. Based on the obtained information, one potential scenario is for the missing person to be traveling to the Grand Canyon. A search grid 50 outlines the potential geographic area of the missing person. The search grid 50 includes calibrated grids 51 indicating time-based areas in which the person may be located. Grid 51*a* indicates the likely location of the person within a first amount of time since he has been missing (e.g., 2 hours). Grid 51*b* indicates the likely location within a greater second amount of time (e.g., 4 hours). Grid 51*c* indicates the likely location with a third amount of time (e.g., 8 hours).

Figure 5:
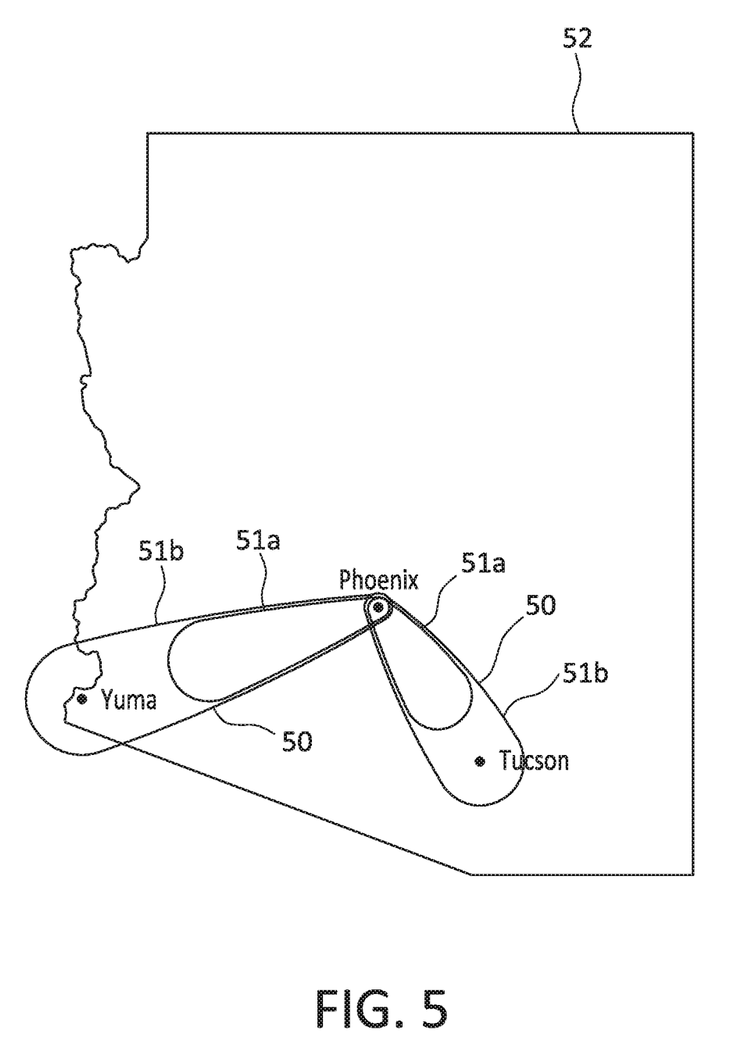
FIG. 5 is a schematic diagram of a map with two separate search grids each corresponding to a potential scenario of a location of the missing person.

Multiple scenarios can be included on a single search grid 50. As illustrated in FIG. 5, two separate scenarios and corresponding calibrated grids 51 have been calculated for a missing person that resides in Phoenix. One potential scenario is for the missing person to travel towards Yuma. The search grid 50 includes calibrated grids 51*a*, 51*b* for potential locations for the person within predetermined time periods. A second potential scenario includes the person traveling towards Tucson. A second search grid 50 includes calibrated grids 51a, 51b for potential locations for the person if traveling in that direction.

The search grids 50 and the fused records are stored and can be accessed by the search entities 90 through the IP network 40. Further, the searching server 20 updates the fused records and search grids 50. Thus, search entities 90 have access to updated information based on new and/or changing information about the missing person. Further, the centralized location of the information provides for each of the search entities 90 to have accessed to the same information.

Figure 6:
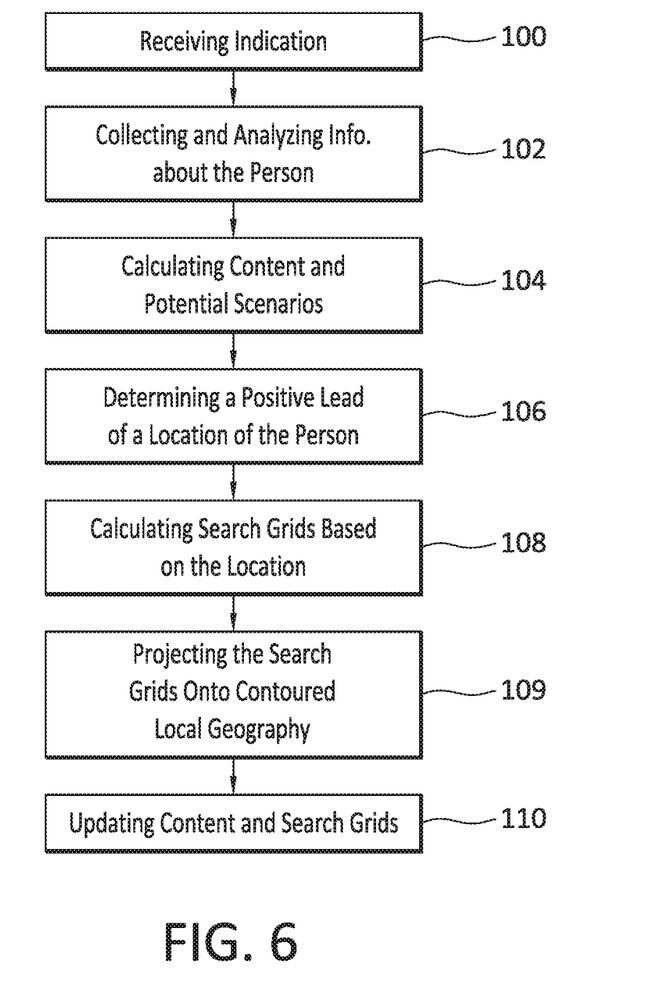
FIG. 6 is a flowchart diagram of a method of searching for a missing person.

FIG. 6 includes a method of searching for a missing person. The method uses the various data sources 30 that can include information about the missing person, analyzes and fuses the information, and distributes and/or provides access to the information for search entities 90.

The method includes receiving an indication that a person is missing (block 100). The indication can be reported to emergency personnel, such as through a call to the police (e.g., 911 call). The emergency personnel can then notify the search system. Alternatively or additionally, the missing person report can be directly reported to the searching server 20 through the IP network 40.

The initial indication can include basic information about the missing person. This can include but is not limited to the person's name, physical description of the person, home address, vehicle information, if the missing person is on any medication, etc. In another example, the identification of the person or details are not known. For example, a witness may have seen an unknown person walking into a wooded area prior to severe weather.

Upon receiving the indication, the missing person is registered in the searching server 20. Registration can include entering the information that is known about the missing person. The registration process may also be performed by the person reporting the missing person by accessing the searching server 20 through the IP network 40 and entering the necessary information.

Once the missing person matter is opened, access to data about the missing person that is in the database 22 can be accessed by search entities 90. In one design, the access is restricted to search entities 90 that have approved credentials, which can be verified through authentication (e.g., username and password).

Once the missing person is registered, the search system interrogates the various data sources 30 through the IP network 40 to obtain additional information (block 102). This can include accessing the person's social media data sources 30 (e.g., FACEBOOK, TWITTER, SNAPCHAT), governmental data sources 30 (e.g., DOT, tax records), phone records 30, sensor data sources 30, and maps 30.

In one method, a first level of searching accesses data sources 30 that are directly related to the missing person. For example, the social media data sources 30 of the missing person, and phone records of the missing person. This first level of searching can lead to second level searching based on relationships of the missing person. For example, first level searching can result in determining that the missing person is a member of a club. Second level searching can search the website of the club. First level searching can determine the names of friends of the missing person. Second level searching can search the media data sources 30 of the friends. Additional relationships and factual patterns can lead to deeper levels of searching (i.e., third-level, fourth level, etc.).

The information obtained from the data sources 30 is analyzed to develop potential scenarios as to where the missing person can be located (block 104). These scenarios can indicate a direction a person may be headed or a destination as well as timing for when the missing person may be there. Using the example of FIG. 4, analyzing the information from the data sources 30 can indicate that the missing person may be headed towards the Grand Canyon. A potential scenario is developed for this aspect by indicating how the person may travel to the Grand Canyon and timing of how the person will progress. FIG. 5 includes calibrated time grids 51 for the different potential scenarios.

Implicitly, the potential scenarios result in geographic locations being outside of areas of interest and thus are not to be searched by search entities. For example, potential scenarios of FIGS. 4 and 5 conclude that the missing person is not located in areas to the east and west of Phoenix. These areas would not be searched or would not receive the same extent of resources as the more likely scenarios. Thus, the searching system focuses the search resources to more specific geographic areas that are more likely to result in finding the missing person. Thus, given a fixed amount of search resources, the searching system can lead to a greater probability of finding the missing person than without the system.

The potential scenarios can also focus the additional searching on the data sources 30 through the IP network 40. Using FIG. 4 as an example, the potential scenario indicates a limited geographic area in which the missing person is expected to be located. Thus, just data sources 30 relevant to this geographic area can be searched for additional information. For example, just traffic cameras within this geographic area can be searched for the missing person's vehicle, or just campgrounds in this geographic area can be searched for additional information. Data sources 30 from outside of this area can be ignored, or at least not searched to the same extent. This focused searching optimizes the available resources, and also can provide for faster results that can be provided to the search entities 90.

The method includes obtaining a positive lead on the missing person (block 106). For example, the missing person's vehicle could have been captured at a certain geographic location and time. Another example is a social media page of the missing person or friend indicates a place and time where the missing person was located. Another example is a search entity 90 finds the missing person's vehicle at a campground.

Figure 7:
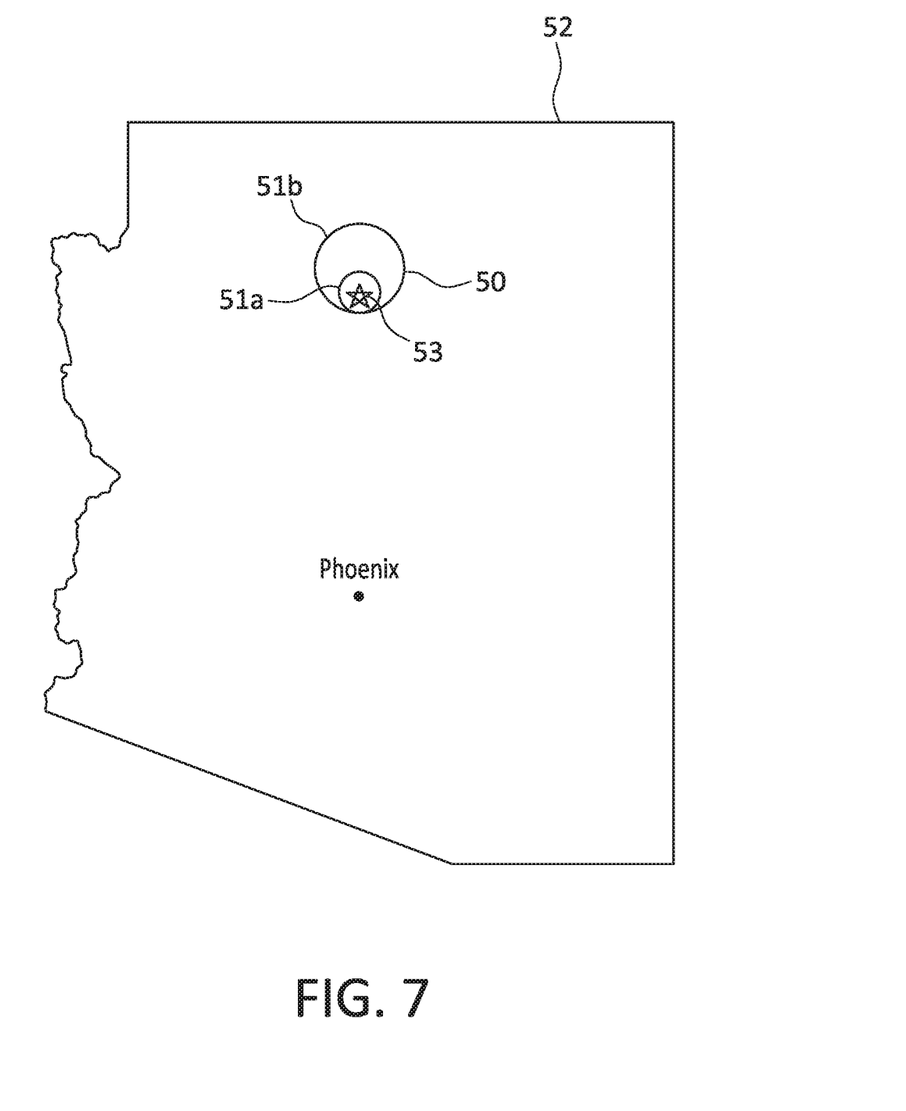
FIG. 7 is a schematic diagram of a map with a smaller search grid based on updated information.

The positive lead can be used to update the records and search grids 50 that are provided to the search entities (block 108). As illustrated in FIG. 7, the search grid 50 is updated to emanate from the location 53 of the positive lead. Calibrated grids 51a, 51b indicated updated probabilities and timing for where the missing person is now expected to be located. Additionally, the records can be updated based on previous information already obtained, or new information that can be obtained. For example, previous information obtained from the missing person's FACEBOOK page can highlight a particular hike through the Grand Canyon. This information can be used by search entities 90 as a high likelihood for finding the missing person. New information about the updated search area can also be obtained from new data sources 30. For example, the missing person's FACEBOOK page can indicate that he is an avid birdwatcher. A new data source 30 about migrations of birds can indicate that a particular bird is migrating through this area at can be found at one or more particular locations. Again, this information can be supplied to search entities.

The search grid 50 can be projected onto a map of the geographic area (block 109). In one design, this includes projecting the search grip 50 onto a map of contoured local geography. This information is available to the search entities 90.

The new information and leads about the missing person provide for updating the records 55 and search grids 50 that are supplied to the search entities (block 110). The size of the search grid 50 may shrink as the leads and additional information are obtained and analyzed. This can be seen as the search grid 50 illustrated in the updated map 52 of FIG. 7 covers a smaller geographic area than he original search grid 50 on the map 52 of FIG. 4.

The updated information and search grids 50 are continuously available to the search entities 90. Persons controlling the search can also use the updated information to place the available resources in the most effective locations. Based on the information, the missing person should eventually be located.

Vehicles with sensors such as camera can be used during the search to provide additional information to the searching server 20. In one design, vehicles include on or more unmanned autonomous vehicles (UAV) that can be remotely operated and are able to be used in a wide variety of environmental conditions. The UAVs can include but are not limited to aircraft that are able to search remote geographic locations, watercraft, and land vehicles. Output from the sensors can be stored in a database that is accessed by the searching server 20 during the search.

In one design, UAVs are not deployed until the search grid 50 has been reduced to a relatively small area. In one method, this can include after a positive lead has been obtained on the person. The UAVs can then be used as part of a more focused search effort once the larger geographic area has been eliminated.

Figure 8:
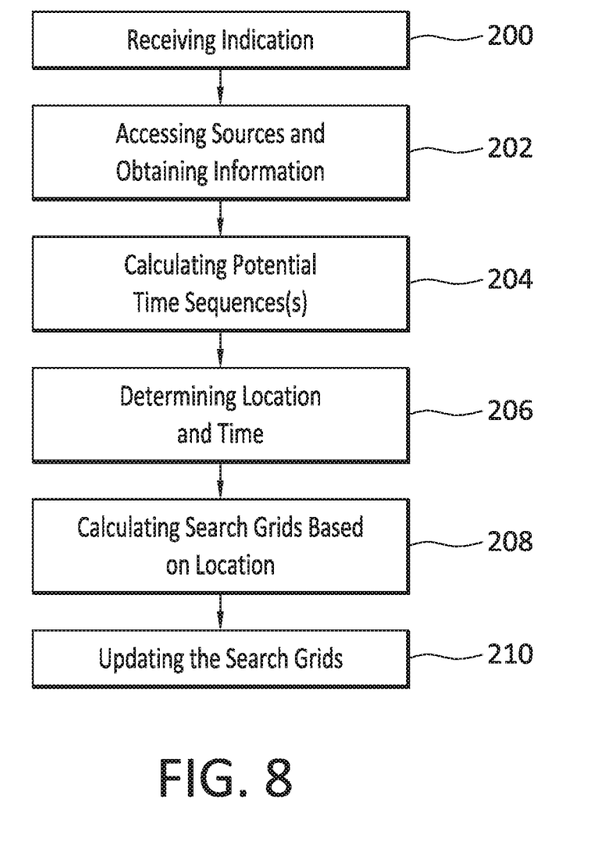
FIG. 8 is a flowchart diagram of a method of searching for a missing person.

FIG. 8 illustrates another method of performing a search for a missing person. An indication that a person is missing is received (block 200). Based on the information known about the missing person, data sources 30 are accessed through the IP network 40 and information is obtained about the missing person (block 202). These data sources 30 can be those directly related to the missing person, and also one or more levels removed from the missing person (e.g., website of a gym where in the missing person belongs).

The information from the different data sources 30 are analyzed and fused together and potential time sequences are developed of where the missing person may be located (block 204). Using FIG. 5 as an example, information obtained from the data sources 30 indicate that the missing person may have gone to Yuma or Tucson. If the missing person were traveling towards Yuma, a first calibrated grid 51*a* indicates where they would be located within a first time period (e.g., within two hours). A second calibrated grid 51*b* indicates where the missing person would be located within a second time period (e.g., within four hours). The number and size of the grids 51 can vary. The size of the search grid 50 and the included calibrated grids 51 can be based on the amount of information obtained about the missing person. If little information is obtained, the search grid 50 can cover a large geographic area as the potential location is uncertain. Conversely, the search grid 50 can be smaller and extend over a smaller geographic area when a greater amount of information is obtained about the missing person.

During the search, a definite location and time of the person is obtained (block 206). This can include various manners, including but not limited to being obtained from a data source 30 through the IP network 40 (e.g., a cell phone record indicating the time and location), or a search entity 90 that finds a witness who saw the missing person. This new information is used to calculate updated search grids based on this time and location (block 208). This new information is more focused and includes a smaller geographic area to search. During the search, the searching server 20 continually updates the information about the missing person and provides for the updated information to be accessible by the search entities 90.

For purposes of explanation, the methods and devices will be disclosed in the context of searching for a missing person. It is understood that these methods and devices are also applicable for searching for entities, such as stolen vehicle. The methods and devices are also applicable for search for two or more missing persons or entities.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of searching for one or more missing persons or entities, the method comprising:
   receiving an indication that one or more persons or entities are missing;
   collecting and analyzing information about the one or more persons or entities from a plurality of data sources accessed through a communications network with the information having been in existence prior to when the one or more persons or entities was missing;
   calculating content and potential scenarios about the one or more persons or entities based on the information from the plurality of data sources;
   generating, within a user interface, a first map of a first geographic area in which the potential scenarios occur;
   obtaining information through the communications network, the information identifying a location of the one or more persons or entities within the first geographic area of the first map with the information received after the one or more persons or entities was missing;
   calculating time-based search grids that emanate from the location;
   generating, within the user interface, a second map that comprises the time-based search grids that extend over a second geographic area with the second geographic area being smaller than the first geographic area; and
   obtaining new information through the communications network and updating the time-based search grids displayed on the second map based on the new information.

2. The method of claim 1, wherein collecting the information about the one or more persons or entities are from the plurality of data sources comprises obtaining the information from social media accounts of the one or more persons or entities.

3. The method of claim 1, wherein collecting the information about the one or more persons or entities from the plurality of data sources comprises obtaining the information from data sources that include sensor data.

4. The method of claim 1, further comprising creating a timeline of events for the potential scenarios based on the content obtained from the plurality of data sources.

5. The method of claim 1, further comprising performing behavioral analysis on the one or more persons or entities using the information and calculating one or more trends about the one or more persons or entities and creating one or more of the potential scenarios.

6. The method of claim 1, wherein determining the positive lead of the location of the one or more persons or entities comprises:
- determining a car that is driven by the one or more persons or entities based on the information; and
- obtaining a sensor reading from one of the plurality of data sources that comprises an image of the car, a location of the car, and a time that the car was at the location.

7. The method of claim 1, further comprising receiving the new information about the one or more persons or entities from an unmanned autonomous vehicle that is operating within the time-based search grid and updating the content and the time-based search grid.

8. The method of claim 1, further comprising limiting a search area for the one or more persons or entities based on the information collected about the one or more persons or entities.

9. The method of claim 1, further comprising obtaining the information in a first level of searching by accessing the data sources that are just directly related to the one or more missing persons or entities.

10. The method of claim 9, further comprising after obtaining the information from the first level of searching, obtaining the information from a second level of searching by accessing the data sources that have relationships with the one or more missing persons or entities.

11. A method of searching for one or more missing persons or entities, the method comprising:
- receiving an input indicating that one or more persons or entities is missing;
- responsive to receiving the input, accessing multiple data sources through a communications network and obtaining information about the one or more persons or entities, the data sources including sensor data, government data, and social media data that was recorded prior to when the one or more persons or entities were missing;
- calculating one or more potential time sequences about the one or more persons or entities based on the information;
- determining a specific location and time where the one or more persons or entities was located;
- calculating one or more calibrated time-based search grids based on the specific location and time;
- generating, within a user interface, a map that includes the time-based search grids; and
- receiving, via the user interface, updated information about the location of the one or more persons;
- based on the updated information obtained after the one or more persons or entities has been missing, generating an update of the map within the user interface that comprises the time-based search grids that have been updated based on newly-received information about the one or more persons or entities with the updated search grids being smaller than the first search grids.

12. The method of claim 11, wherein accessing multiple data sources through the communications network comprises accessing the social media data and determining the specific location and the time where the one or more persons or entities had previously visited.

13. The method of claim 11, further comprising aggregating the information about the one or more persons or entities from the multiple data sources and calculating the one or more potential time sequences about the one or more persons or entities.

14. The method of claim 11, wherein determining the specific location and the time of the one or more persons or entities comprises obtaining a captured image of the one or more persons or entities from one of the data sources and determining the location of the one or more persons or entities at the time of the image.

15. The method of claim 11, wherein calculating one or more potential time sequences about the one or more persons or entities comprises analyzing the information and calculating one or more behavioral patterns about the one or more persons or entities.

16. The method of claim 11, further comprising determining an additional person that is referenced in one of the data sources references through the communications network and accessing social media accounts of the additional person through the communications network and obtaining the information about the one or more persons or entities.

17. A computing device configured to search for one or more missing persons or entities, the computing device comprising:
- communication interface circuit configured to communicate data with one or more remote data sources via a communications network;
- memory circuit configured to store a search application;
- processing circuit operatively connected to the communication interface circuit and the memory circuit, and configured to execute the search application to:
  - receive an indication that a one or more persons or entities is missing;
  - collect and analyze information about the one or more persons or entities from prior to when the one or more persons or entities was missing, the information from a plurality of data sources accessed through the communications network;
  - calculate potential scenarios about the one or more persons or entities based on the information from the plurality of data sources;
  - generate, within a user interface, a first map that includes the potential scenarios with the first map comprising a first geographic area;
  - obtain information through the communications network, the information identifying a location of the one or more persons or entities within the first geographic area;
  - calculate time-based search grids that emanate from the location;
  - generate, within the user interface, a second map that includes the time-based search grids with the second map comprising a second geographic area that is smaller than the first geographic area; and
  - obtain new information from after the one or more missing persons has been missing through the communications network and update the time-based search grids of the second map based on the new information.

18. The computing device of claim 17, wherein the processing circuit is configured to collect information from social media platforms of the missing one or more persons or entities.

19. The computing device of claim 17, wherein the processing circuit is configured to obtain the information from social media accounts of the one or more persons or entities.

20. The computing device of claim 17, wherein the processing circuit is further configured to create a timeline of events for the potential scenarios based on the content obtained from the plurality of data sources.

\* \* \* \* \*